US009620972B2

(12) United States Patent
Oh et al.

(10) Patent No.: US 9,620,972 B2
(45) Date of Patent: Apr. 11, 2017

(54) WIRELESS CHARGING DEVICE

(71) Applicant: LG ELECTRONICS INC., Seoul (KR)

(72) Inventors: Hyunseok Oh, Seoul (KR); Byunghwa Lee, Seoul (KR); Choonghwan Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 311 days.

(21) Appl. No.: 14/463,749

(22) Filed: Aug. 20, 2014

(65) Prior Publication Data

US 2015/0162767 A1 Jun. 11, 2015

(30) Foreign Application Priority Data

Dec. 10, 2013 (KR) ........................ 10-2013-0153432

(51) Int. Cl.

| H02J 7/00 | (2006.01) |
| H02J 7/02 | (2016.01) |
| F21V 33/00 | (2006.01) |
| H04R 1/02 | (2006.01) |
| G06F 1/16 | (2006.01) |
| H04M 1/04 | (2006.01) |

(52) U.S. Cl.
CPC ........ *H02J 7/0044* (2013.01); *F21V 33/0004* (2013.01); *H02J 7/025* (2013.01); *H04R 1/028* (2013.01); *G06F 1/1632* (2013.01); *H02J 7/0027* (2013.01); *H04M 1/04* (2013.01)

(58) Field of Classification Search
USPC ........................................................ 320/108
See application file for complete search history.

(56) References Cited

U.S. PATENT DOCUMENTS

| 2010/0081473 A1 | 4/2010 | Chatterjee et al. |
| 2012/0104197 A1 | 5/2012 | Jensen |
| 2013/0058023 A1 | 3/2013 | Supran et al. |
| 2013/0207478 A1 | 8/2013 | Metcalf et al. |

OTHER PUBLICATIONS

European Search Report issued in Application No. 14002906.7 dated May 4, 2015.

*Primary Examiner* — Brian Ngo
(74) *Attorney, Agent, or Firm* — Ked & Associates, LLP

(57) ABSTRACT

A wireless charging device disclosed herein includes a housing having a wireless charging module mounted therein, an upper cover covering an upper surface of the housing, the upper cover having screw holes formed on one surface thereof, screws inserted into the screw holes to couple the housing and the upper cover to each other, magnets inserted into the screw holes to overlap the screws, and a pad disposed to cover the upper cover, the pad having a terminal mounting surface.

20 Claims, 12 Drawing Sheets

WIRELESS CHARGING DEVICE

CROSS-REFERENCE TO RELATED APPLICATION

Pursuant to 35 U.S.C. §119(a), this application claims the benefit of earlier filing date and right of priority to Korean Application No. 10-2013-0153432, filed on Dec. 10, 2013, the contents of which is incorporated by reference herein in its entirety.

BACKGROUND

1. Field

This specification relates to a wireless charging device for a mobile terminal.

2. Background

Recently, a large-capacity battery is required due to watching of videos or TV programs being enabled by receiving broadcast or multicast signal through a mobile terminal. However, in spite of continuous researches, a battery having a satisfactory capacity has not been developed yet. As a result, unless a (re)charging operation is carried out by determining appropriate charging timing and charging method based on a remaining amount of battery power, a situation in which a video or TV program is not allowed to be watched using a mobile terminal may frequently occur.

Accordingly, various types of charging devices and related methods for charging a battery of a mobile terminal in a simple manner are under development. In general, for charging a battery of a mobile terminal, there may be a requirement for a charging unit (a charging system or a charging device), which is connected to a general power source to supply electric power (electricity) to the battery of the mobile terminal. Contact terminals may be provided on outer surfaces of the charging unit and the battery, respectively. The battery may be (re)charged in a manner of connecting the two contact terminals to each other. However, if the contact terminals are provided on the outer surfaces of the charging unit and the battery, it may spoil appearances of them. Also, the contact terminals may be exposed to moisture, which may result in a loss of charging energy or a non-smooth charging operation due to poor contact.

To address the drawbacks, a method of charging a battery in a wireless manner without configuring contact terminals at a charging unit and battery has been developed and used in some application fields.

However, the related art wireless charging device cannot fix a mobile terminal at a specific posture, which may interfere with stable charging. Further, the related art wireless charging device has a fixed use orientation, such as horizontal or vertical. This may bring about a limitation in use of the mobile terminal during charging.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. A singular representation may include a plural representation unless it represents a definitely different meaning from the context.

Hereinafter, suffixes "module" and "unit or portion" for components used herein in description are merely provided only for facilitation of preparing this specification, and thus they are not granted a specific meaning or function.

A mobile terminal disclosed herein may include a mobile phone, a smart phone, a laptop computer, a digital broadcast terminal, a personal digital assistant (PDA), a portable multimedia player (PMP), a navigator, and the like. However, it may be easily understood by those skilled in the art that the configuration according to the exemplary embodiments of this specification may be applied to stationary terminals such as digital TV, desktop computers and the like excluding a case of being applicable only to the mobile terminals.

Figure 1:
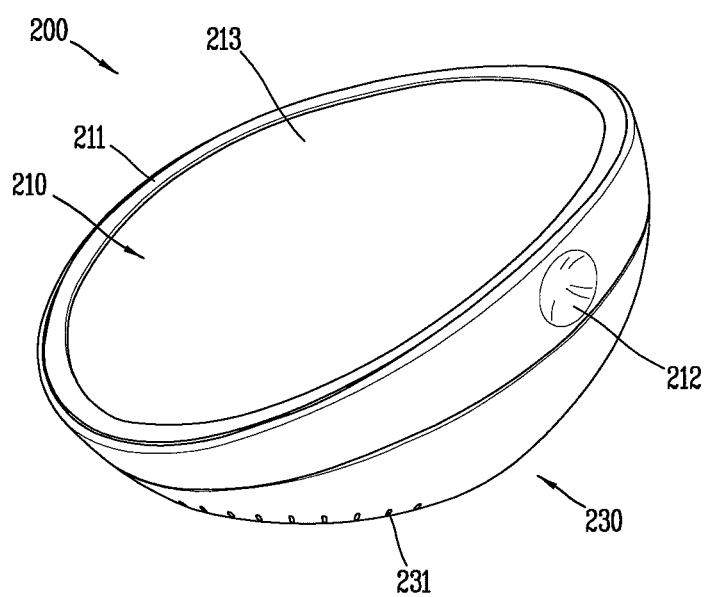
FIG. 1 is a perspective view of a wireless charging device in accordance with one exemplary embodiment disclosed herein.

FIG. 1 is a perspective view of a wireless charging device 200 in accordance with one exemplary embodiment disclosed herein.

As illustrated in FIG. 1, a wireless charging device 200 may include a housing 230, and a pad 210 disposed to cover an upper surface of the housing 230. FIG. 1 illustrates that the housing 230 and the pad 210 are directly coupled to each other. However, in accordance with another embodiment, an upper cover 220 may be interposed between the housing 230 and the pad 210, which will be described in detail with reference to FIG. 3.

Referring to FIG. 1, the pad 210 may include a mounting surface 213 on which a mobile terminal 100 is mounted (placed). The mounting surface 213 may be inclined toward the ground, e.g., inclined relative to a horizontal plane or a surface on which the housing is placed. That is, as illustrated, the wireless charging device 200 may have an inclined hemispherical shape. The upper surface of the housing 230 may be formed to have an inclination from a bottom surface 232 (see FIG. 13), and the pad 210 may be coupled to the upper surface.

The pad 210 may be provided with an anti-slip member 211 attached thereto. The anti-slip member 211 may cover at least part of the terminal mounting surface 213 so as to prevent the mobile terminal 100 from being slipped due to the inclination of the mounting surface 213.

The anti-slip member 211 may be formed along an edge of the pad 210. The pad 210 may have a shape of a circular plate (disc), and the anti-slip member 211 may form a band in a shape of a ring along the edge of the pad 210.

The anti-slip member 211 may be made of a material having a relatively high coefficient of friction, such as urethane or rubber. However, the anti-slip member 211 may not be limited to the material, but be implemented by using any material if it has a higher coefficient of friction than a material forming the mounting surface 213.

A recess 212 may be formed on a side surface of the pad 210. The recess 212 may be formed to prevent a hand from being slipped when relatively rotating the pad 210 with respect to the housing 230.

In accordance with another exemplary embodiment disclosed herein, the mounting surface 213 may include a gel layer whose shape is changed in response to pressure applied. When the mobile terminal 100 is placed on the mounting surface 213, the gel layer may change in shape to correspond to an outer shape of the terminal due to a weight of the terminal. That is, when the mobile terminal 100 is placed on the mounting surface 213, the shape of the gel layer may change. Accordingly, a contact area and a friction between the gel layer and the mobile terminal 100 may increase, thereby preventing the terminal from being slipped from the mounting surface 213.

The pad 210 may have a central portion which is thinner than both end portions thereof. For example, the pad 210 may be formed in an arcuate shape such that the mobile terminal 100 having a curved rear surface can be stably mounted thereon.

Figure 2A:
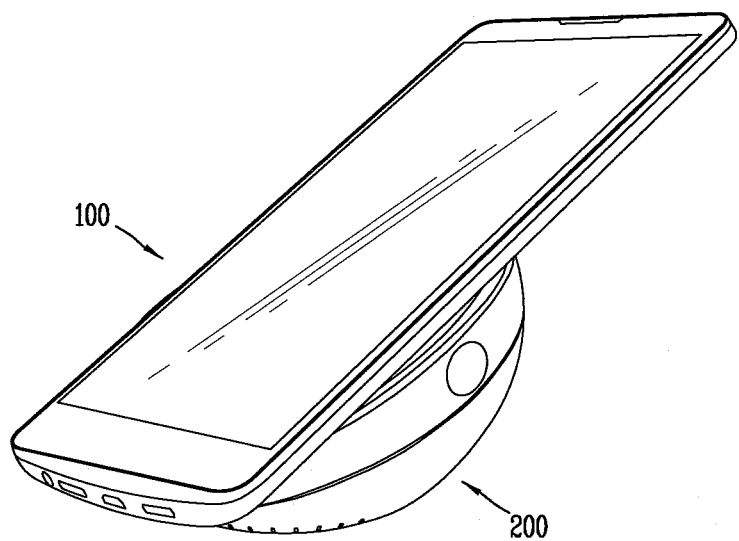
FIGS. 2A and 2B are exemplary views of using a wireless charging device disclosed herein.
Figure 2B:
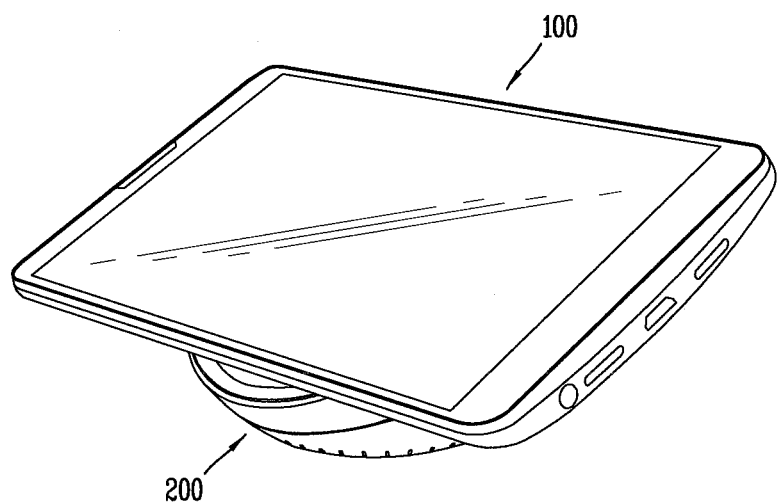
Figure 2C:
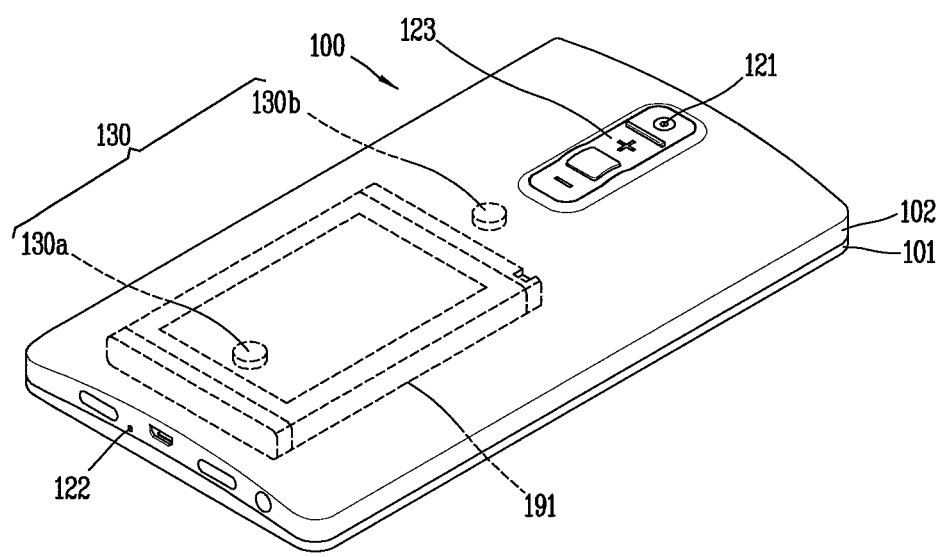
FIG. 2C is a conceptual view of a mobile terminal illustrated in FIG. 2A.

FIGS. 2A and 2B are exemplary views of using a wireless charging device 200 disclosed herein, and FIG. 2C is a conceptual view of a mobile terminal illustrated in FIG. 2A.

FIGS. 2A and 2B, a mobile terminal 100 may be mounted on the wireless charging device 200 in a vertical mode (see FIG. 2A) and a horizontal mode (see FIG. 2B). The mode may be changed by rotating the pad 210 while the mobile terminal 100 is placed on the pad 210. Here, since the mounting surface 213 of the pad 210 has the arcuate shape, the pad can also be rotated with stably maintaining a mounted state even of a mobile terminal having a curved rear surface. Also, magnets for guiding the mobile terminal 100 to an optimal charging position may be disposed below the pad 210. The magnets may prevent the mobile terminal from being randomly separated from the wireless charging device 200 by applying an attractive force to the mobile terminal 100. The arrangement of the magnets will be described in detail later with reference to FIGS. 5 to 7.

FIG. 2C illustrates one exemplary embodiment of the mobile terminal 100 mounted onto the wireless charging device 200.

As illustrated in FIG. 2C, the mobile terminal 100 mounted onto the wireless charging device 200 disclosed herein may have a bar-type terminal body. However, the present disclosure may not be limited to the type, but be applicable to various structures, such as a slide type, a folder type, a swing type and the like, which have two or more bodies coupled to be relatively movable. In addition, the mobile terminal 100 disclosed herein may also be applied to a random portable electronic device, such as a cellular phone, a smart phone, a laptop computer, a digital broadcast terminal, a personal digital assistant (PDA), a portable multimedia player (PMP), and the like, each having a camera and a flash.

The terminal body may include a case (or referred to as casing, housing 230, cover, etc.) defining an appearance. The case may include a front case 101, and a rear case 102 covering an opposite surface to the front case 101. The drawings illustrate a battery-embedded mobile terminal 100, but the concept of the present disclosure may also be applicable to a battery-detachable mobile terminal 100.

Various electronic components may be disposed in a space formed between the front case 101 and the rear case 102. Those cases may be formed by injecting synthetic resin, or formed of a metal, such as stainless steel (STS), titanium (Ti) and the like.

A power supply unit 191 and a rear camera 121 may be disposed on a rear surface of the terminal body.

A flash may be disposed adjacent to the rear camera 121. The flash may emit light toward an object to be photographed when taking a picture using the rear camera 121.

A mirror may be disposed adjacent to the flash. The mirror may cooperate with the rear camera module 121 to allow a user to photograph himself in a self-portrait mode.

The battery may supply power to the mobile terminal 100. The battery may be embedded in the terminal body or detachably coupled to an outside of the terminal body.

Magnets or metals which are attracted by magnets may be disposed inside the mobile terminal 100. The magnets or metals may be attached onto an inner surface of the rear case. For a mobile terminal 100 having a detachable battery, the magnets or metals may be attached onto an inner surface of a battery cover. The magnets or metals may be detachable.

In accordance with one exemplary embodiment disclosed herein, the magnets or metals may be spaced apart from each other along a lengthwise direction of the terminal. For example, a first magnet 130a may be attached onto a lower portion of the terminal, and a second magnet 130b may be disposed on an upper portion of the terminal with being spaced apart from the first magnet 130a.

Figure 3:
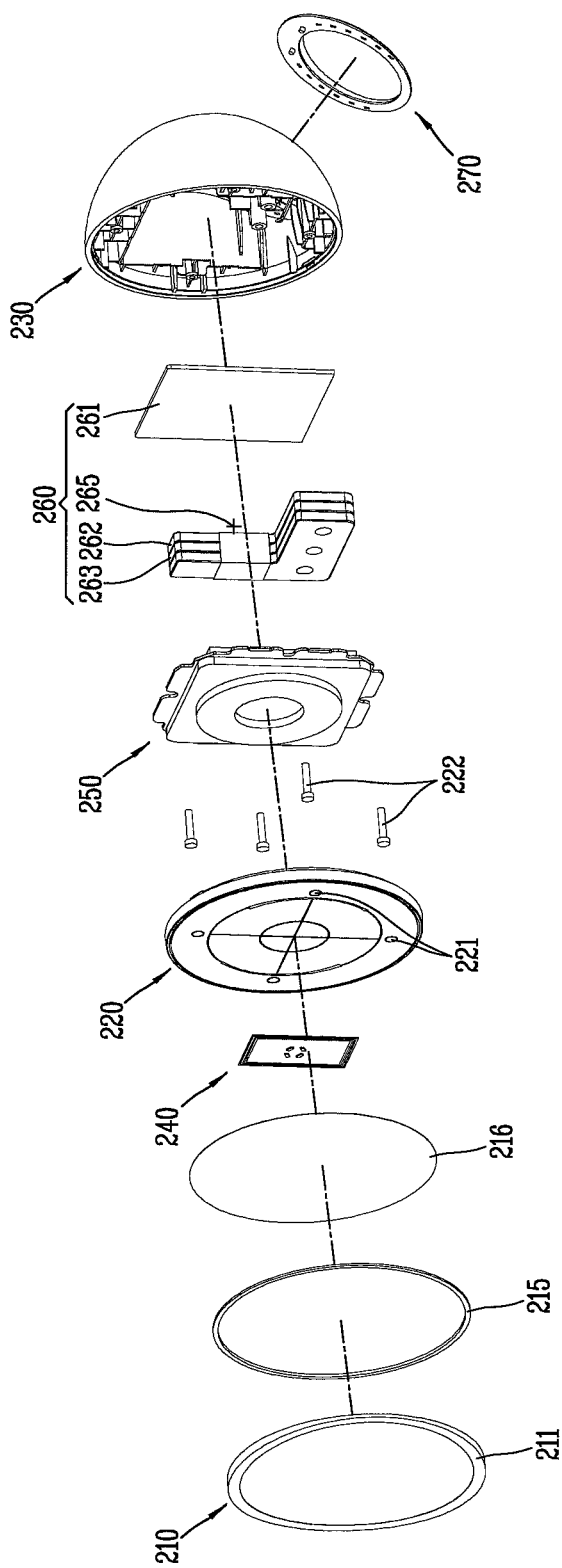
FIG. 3 is an exploded perspective view of a wireless charging device in accordance with one exemplary embodiment disclosed herein.

FIG. 3 is an exploded perspective view of a wireless charging device 200 in accordance with one exemplary embodiment disclosed herein.

As illustrated in FIG. 3, the wireless charging device 200 may include a housing 230, an upper cover 220, a pad 210, a light-emitting module 240, a wireless charging module 250, a speaker module 260, and the like.

The housing 230 may have a shape of a hollow hemisphere. A bottom member 270 may be attached onto a bottom surface 232 (see FIG. 13) of the housing 230. The bottom member 270 may be made of a material with a higher frictional force than the housing 230, thereby preventing the bottom surface 232 from being slipped. The bottom member 270 may be provided with speaker holes 231 through which sound is emitted to a lower side of the housing 230.

The wireless charging module 250, the speaker module 260 and the like may be disposed in the housing 230.

The wireless charging module 250 may charge the mobile terminal 100 placed on the pad 210. A wireless charging method will be described in detail with reference to FIG. 11A.

The speaker module 260 may include an audio circuit 261 generating sound, a soundproofing set generating a resonance space by overlapping the audio circuit 261.

The soundproof set may be formed in a manner of coupling a soundproof pad 253, which overlaps an upper surface of the speaker module 260 for reducing an upward leakage of sound, a weight member 262 and the like. The weight member 262 may allow for maintenance of stability of the wireless charging device 200 even when mounting a terminal thereon, by lowering a center of weight of the wireless charging device 200.

An empty space 265 may be formed at one side of the soundproof set. The empty space 265 may reflect sound generated from the audio circuit 261 to be emitted into speaker holes 231 disposed at a lower side of the device 200. That is, the sound generated from the audio circuit 261 may partially be emitted directly to the outside through the speaker holes 231 and the remaining sound without being emitted outwardly may be amplified in the empty space 265 and then emitted through the speaker holes 231.

The upper cover 220 may cover the upper surface of the housing 230. As illustrated in FIG. 3, the upper cover 220 may be formed in a, disc shape, and provided with a plurality of screw holes 221 on one surface thereof. Screws 222 may be inserted through the screw holes 221 such that the upper cover 220 and the housing 230 can be coupled to each other. The drawing exemplarily illustrates four screws 221 which are arranged with being apart from a center of the upper cover 220 by the same distance.

The light-emitting module 240 may be arranged to be mounted on one surface of the upper cover 220. In accordance with one exemplary embodiment, the light-emitting module 240 may be disposed at a central portion of the upper cover 220, and the screw holes 221 may be formed to be symmetric to one another in four directions relative to the center of the light-emitting module 240.

The pad 210 may overlap the upper cover 220. The pad 210 may include a mounting surface which covers one surface of the upper cover 220 and on which the mobile terminal 100 is placed. An anti-slip member 211 may be attached onto an edge of the pad 210.

A light-guide film 216 may be disposed between the pad 210 and the upper cover 220. The light-guide film 216 may guide light, which is generated from the light-emitting module 240, to be externally emitted through a gap between the pad 210 and the upper cover 220. That is, even if light sources 244 (see FIG. 5) of the light-emitting module 240 are arranged along a specific direction, light irradiated from the light sources 244 may be emitted through a circumference of the device.

A transparent member 215 may be disposed along an outer edge of the light-guide film 216. The transparent member 215 may be formed in a shape of a ring, and configure a part of the appearance of the device. The transparent member 215 may be formed of a material with a high refraction index such that incident light can be refracted and then emitted. Also, the transparent member 215 may be made of a material allowing for scattered reflection of light.

Figure 4:
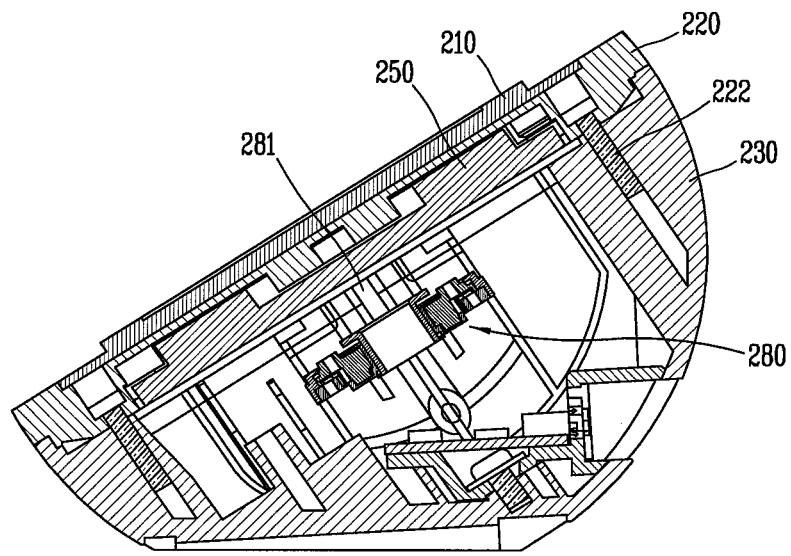
FIG. 4 is a side sectional view of a wireless charging device in accordance with one exemplary embodiment disclosed herein.

FIG. 4 is a side sectional view of a wireless charging device 200 in accordance with one exemplary embodiment disclosed herein.

As illustrated in FIG. 4, the pad 210 may be rotatable by a rotation hinge 281. The pad 210 may include the rotation hinge 281 coupled to the housing 230 to form a rotation shaft. In more detail, a rotation module 280 to which the rotation hinge 281 is fixed may be mounted to an inner side of the housing 230. One end of the rotation hinge 281 may be fixed to the pad 210, and the other end thereof may be fixed to the rotation module 280.

The pad 210 may have a shape of a disc, and the one end of the rotation hinge 281 may be fixed to a center of the pad 210. An outer appearance of the device may not be changed even when the pad 210 is rotated centering on the rotation shaft. This may allow the mobile terminal 100 to be used in both the horizontal mode and the vertical mode in a turning manner even after placing it on the device.

Figure 5:
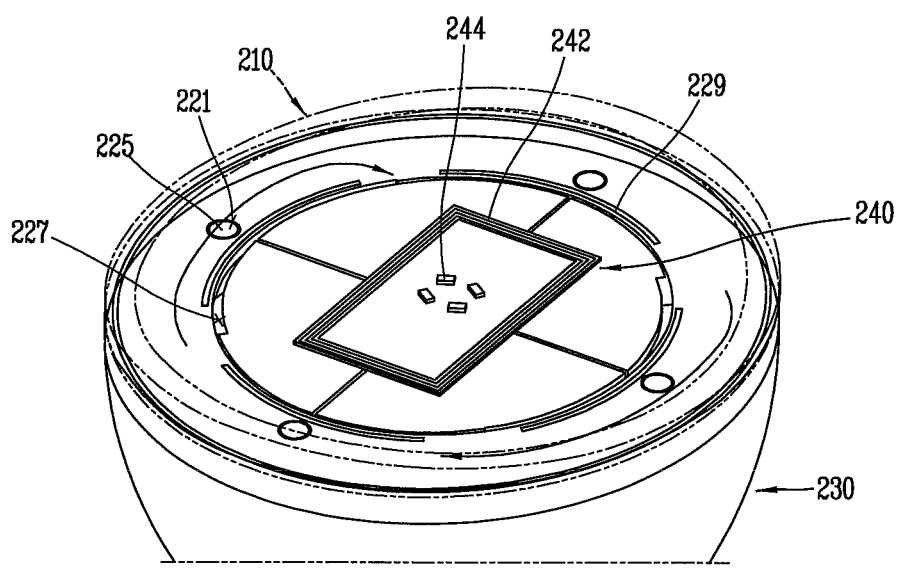
FIG. 5 is a conceptual view of a wireless charging device in accordance with another exemplary embodiment disclosed herein.
Figure 6:
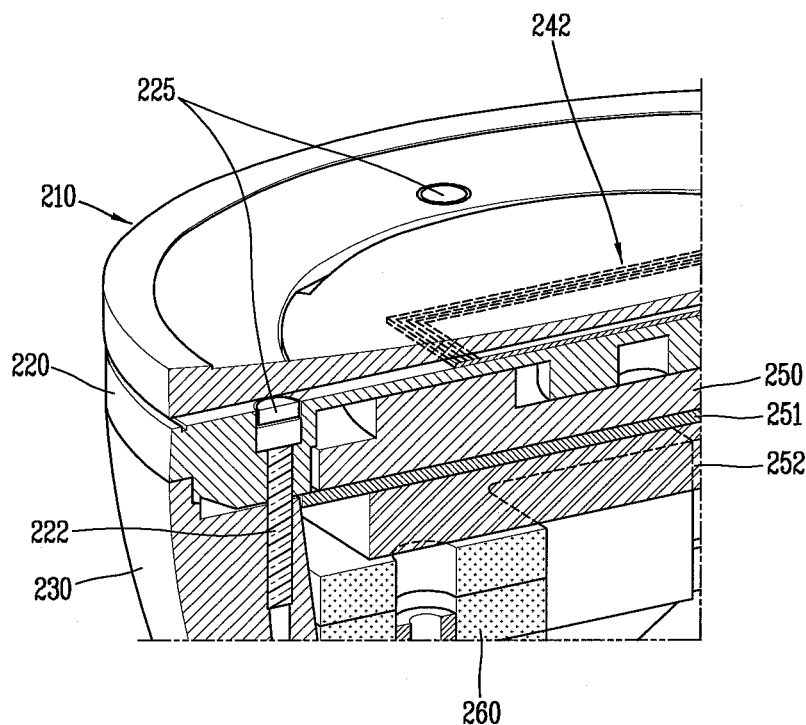
FIG. 6 is a sectional view of the wireless charging device illustrated in FIG. 5.
Figure 7:
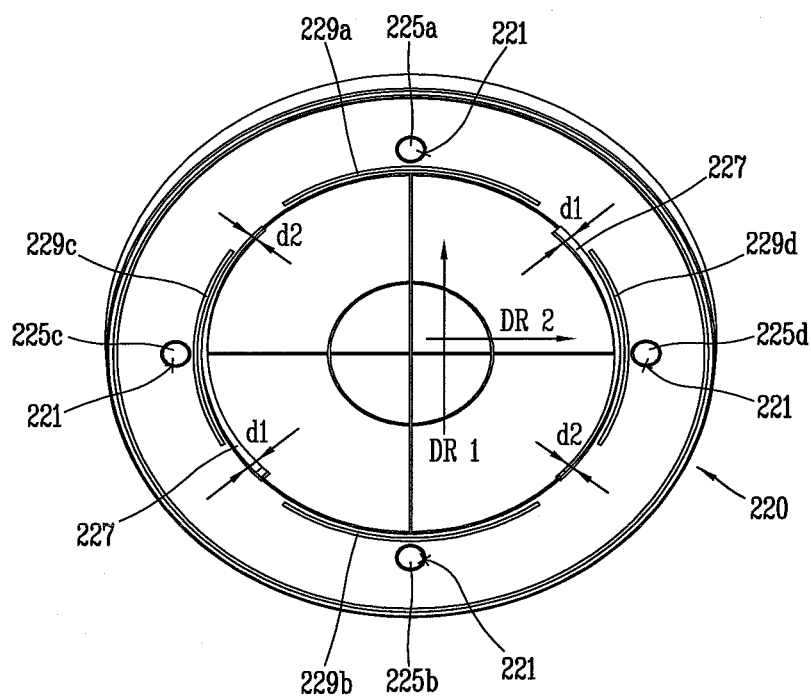
FIG. 7 is a planar view of the wireless charging device illustrated in FIG. 5.

FIG. 5 is a conceptual view of a wireless charging device 200 in accordance with one exemplary embodiment disclosed herein, FIG. 6 is a sectional view of the wireless charging device 200 illustrated in FIG. 5, and FIG. 7 is a planar view of the wireless charging device 200 illustrated in FIG. 5.

As illustrated in FIGS. 5 to 7, screw holes 221 may be formed on an upper cover 220. Screws 222 may be inserted into the screw holes 221 to fix the upper cover 220 to the housing 230.

The screw holes 221 may be formed to be deeper than a thickness of a screw head. The screw heads 223 of the screws 222 may be completely inserted into the screw holes 221. After inserting the screws 222 into the screw holes 221, there may be generated a remaining space as large as a difference between a thickness of the screw hole 221 and a thickness of the screw head 223.

Magnets 225 may be mounted in the remaining spaces, respectively. This may allow the magnets 225 to be fixed merely in such a manner of inserting the same into the screw holes 221, without use of an adhesive or an adhesive tape. That is, the magnets 225 may be stably arranged by being inserted in the screw holes 221, and can be prevented from being separated out of the screw holes 221 due to an attractive force between the screw head 223 and the magnet 225.

Figure 12:
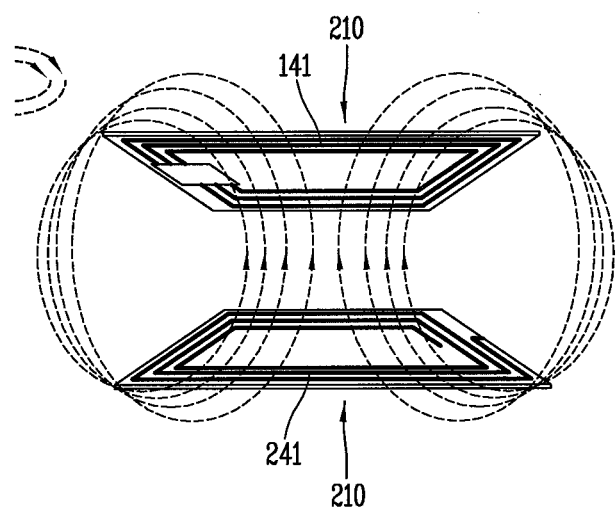
FIG. 12 is a conceptual view illustrating an operation of a light-emitting module disclosed herein.

A light-emitting module 240 may be disposed on one surface of the upper cover 220. The light-emitting module 240 may include light sources 244, and a coil 242 electrically connected to the light sources 244. The coil 242 may generate an induced electromotive force by interaction with an antenna module within the mobile terminal 100 or a wireless charging module 250. Referring to FIG. 12, a near field communication (NFC) antenna located in the mobile terminal 100 may be used as a primary coil 141. When a current is applied to the primary coil 141, a magnetic field may be changed in the terminal. The change in the magnetic field may bring about a generation of an induced electromotive force in a secondary coil 241. The light sources 244 may emit light by the induced electromotive force. In accordance with another exemplary embodiment, the coil of the light-emitting module 240 may generate a current by the change in a magnetic field of the wireless charging module 250 located in the wireless charging device 200.

Referring to FIG. 7, the screw holes 221 may include a first screw hole and a second screw hole which are spaced from each other in a first direction DR1. Also, a third screw hole and a fourth screw hole may be formed in a second direction DR2 which intersects with the first direction DR1. The first direction DR1 and the second direction DR2 may be orthogonal to each other. The first direction DR1 may be a vertical direction and the second direction DR2 may be a horizontal direction. First to fourth magnets 225a to 225d may be inserted into the first to fourth screw holes, respectively.

When the mobile terminal 100 is placed on the wireless charging device 200 in a vertical mode, it may be guided to an optimal charging position by the first magnet 225a and the second magnet 225b. Also, when the mobile terminal 100 is placed on the wireless charging device 200 in a horizontal mode, it may be guided to an optimal charging position by the third magnet 225c and the fourth magnet 225d.

Referring to FIGS. 5 and 7, the light-emitting module 240 may be disposed on a central portion of the upper cover 220. The light-emitting module 240 may include a plurality of light sources 244 which emit light to different directions. The light sources 244 may be arranged to face between the adjacent magnets.

In accordance with one exemplary embodiment, a shield member 229 which shields the magnetic fields of the magnets may be disposed between the magnets and the light-emitting module 240. The shield member 229 may be made of a ferrite material. The shield member 229 may be configured by shielding walls each surrounding a part of a circumference of the light-emitting module 240. The shielding walls may include a first shielding wall 229a formed between the first magnet 225a and the light-emitting module 240, a second shielding wall 229b formed between the second magnet 225b and the light-emitting module 240, a third shielding wall 229c formed between the third magnet 225c and the light-emitting module 240, and a fourth shielding wall 229d formed between the third shielding wall 229d and the light-emitting module 240. Each of the shielding walls may be formed in an arcuate shape.

Figure 8:
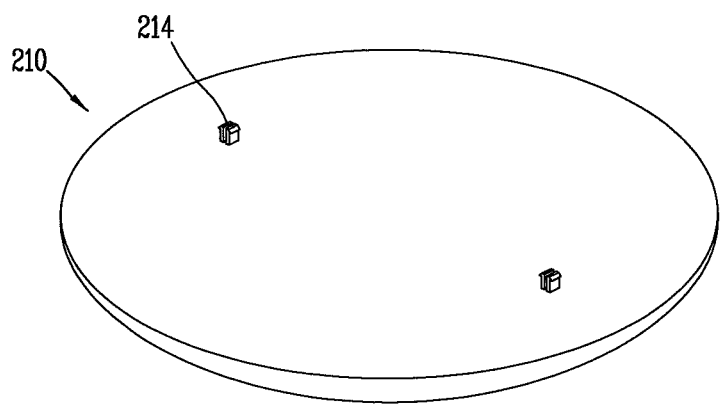
FIG. 8 is a conceptual view of a pad in accordance with one exemplary embodiment disclosed herein.
Figure 9:
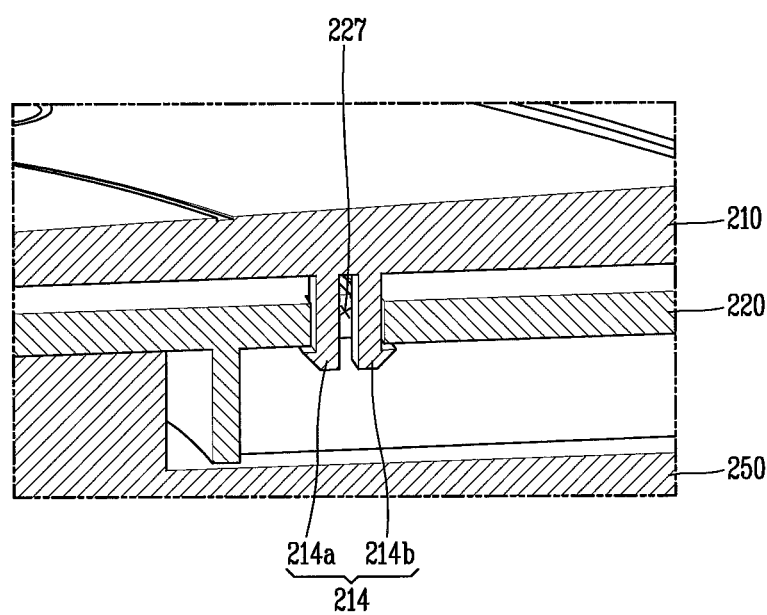
FIG. 9 is an enlarged conceptual view of a hook illustrated in FIG. 8.
Figure 10:
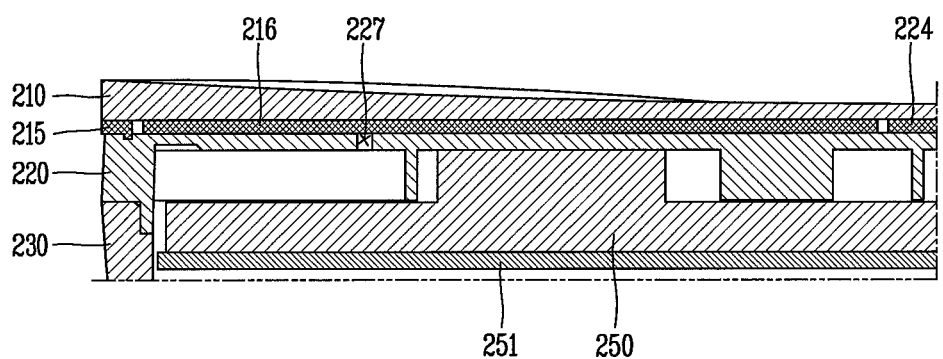
FIG. 10 is a side sectional view of an upper cover.

FIG. 8 is a conceptual view of a pad 210 in accordance with one exemplary embodiment disclosed herein, FIG. 9 is an enlarged conceptual view of a hook 214 illustrated in FIG. 8, and FIG. 10 is a side sectional view of an upper cover 220.

As illustrated in FIGS. 8 and 9, hooks 214 may be formed on a lower surface of the pad 210. Each of the hooks 214 may include a first protrusion member 214a and a second protrusion member 214b both extending from the lower surface to face each other. The protrusion members 214a and 214b may be inserted into guide holes 227 of the upper cover 220 and move along the guide holes 227.

Referring back to FIG. 7, the guide holes 227 each in an arcuate shape may be formed on the upper cover 220. The guide holes 227 may be symmetrical to each other based on a center of the upper cover 220. In accordance with one exemplary embodiment, a thickness d1 of one end portion of the guide hole 227 may be greater than a thickness d2 of the other end portion thereof.

The pad 210 may be relatively rotatable with respect to the upper cover 220. That is, according to this exemplary embodiment, the hooks 214 may fix the pad 210 to the upper cover 220 and simultaneously allow the pad 210 to be relatively rotatable with respect to the upper cover 220.

Each of the guide holes 227 may be formed in such a manner that one end portion thereof is getting narrower in width toward the other end. The protrusion members 214a and 214b inserted into the guide holes 227 may be transformed by receiving a force while moving to the other end of the guide hole 227. That is, as the pad 210 is rotated closer to a rotation-completed point, the protrusion members 214a and 214b may reduce a rotation speed of the pad 210 due to the narrowed guide holes 227.

Referring to FIG. 10, the wireless charging module 250 may be disposed below the upper cover 220. The wireless charging module 250 may be connected to a circuit board to receive power. An operation principle of the wireless charging module 250 will be described hereinbelow with reference to FIG. 11A and FIG. 11B.

Figure 11A:
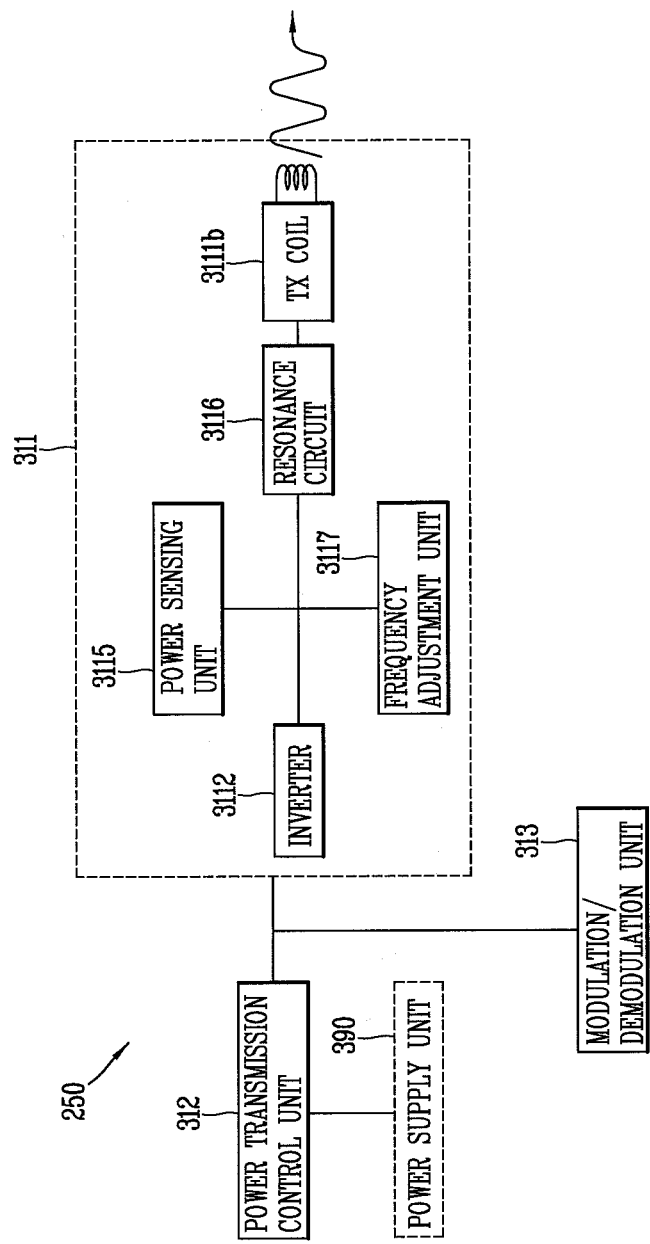
FIGS. 11A and 11B is a conceptual view illustrating an operation of a wireless charging module disclosed herein.
Figure 11B:
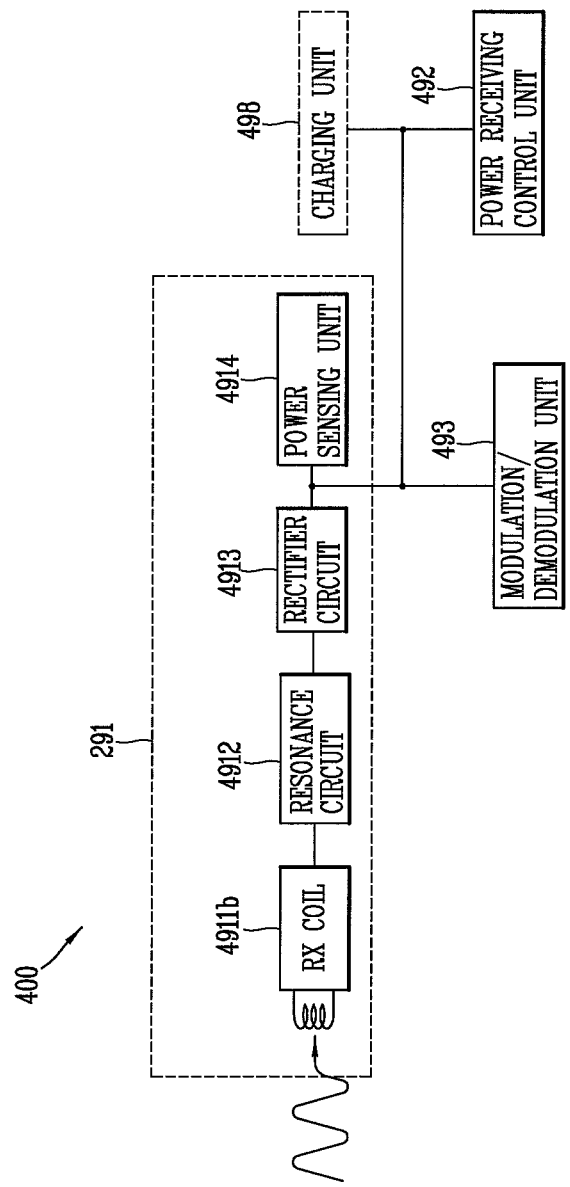

FIG. 11A and FIG. 11B is a conceptual view illustrating an operation of a wireless charging module 250 disclosed herein.

FIG. 11A is a block diagram exemplarily illustrating an electromagnetic induction-type wireless charging module 250 employable in the embodiments disclosed herein, and FIG. 11B is a block diagram exemplarily illustrating a partial configuration of a terminal charging circuit 400.

Referring to FIG. 11A, a power conversion unit 311 of the wireless charging module 250 may include a transmitting coil (Tx coil) 3111b and an inverter 3112.

The transmitting coil 3111b may form a magnetic field corresponding to a wireless power signal according to a change in current. In some embodiments, the transmitting coil 3111b may be implemented as a planar spiral type. Also, in other embodiments, the transmitting coil 3111b may be implemented as a cylindrical solenoid type.

The inverter 3112 may transform a DC input obtained from a power supply unit 390 into an AC waveform. The AC current transformed by the inverter 3112 may drive a resonant circuit including the transmitting (Tx) coil 3111b and a capacitor (not illustrated) to form a magnetic field in the transmitting (Tx) coil 3111b.

In addition, the power conversion unit 311 may further include a positioning unit (not illustrated).

The positioning unit may move or rotate the transmitting (Tx) coil 3111b to enhance the effectiveness of contactless power transfer using an inductive coupling method. It is because an alignment and distance between the wireless charging module 250 and the terminal charging circuit 400 both including a primary coil and a secondary coil may affect power transfer using the inductive coupling method. In particular, the positioning unit may be used when the terminal charging circuit 400 does not exist within an active area of the wireless charging module 250.

Accordingly, the positioning unit may include a drive unit (not shown) for moving the transmitting (Tx) coil 3111b such that a center-to-center distance of the transmitting (Tx) coil 3111b of the wireless charging module 250 and a receiving (Rx) coil 4911a of the terminal charging circuit 400 is within a predetermined range, or rotating the transmitting (Tx) coil 3111b such that the centers of the transmitting (Tx) coil 3111b and the receiving (Rx) coil 4911a are overlapped with each other.

For this purpose, the wireless charging module 250 may further include a detection unit (not illustrated) made of a sensor for detecting the location of the terminal charging circuit 400, and a power transmission control unit 312 may control the positioning unit based on the location information of the terminal charging circuit 400 received from the location detection sensor.

Furthermore, to this end, the power transmission control unit 312 may receive control information on an alignment or distance to the terminal charging circuit 400 through a modulation/demodulation unit 313, and control the positioning unit based on the received control information on the alignment or distance.

If the power conversion unit 311 is configured to include a plurality of transmitting coils, then the positioning unit may determine which one of the plurality of transmitting coils is to be used for power transfer.

On the other hand, the power conversion unit 311 may further include a power sensing unit 3115. The power sensing unit 3115 at the side of the wireless charging module 250 may monitor a current or voltage flowing into the transmitting (Tx) coil 3111*b*. The power sensing unit 3115 may be provided to check whether or not the wireless charging module 250 is normally operated, and thus the power sensing unit 3115 may detect a voltage or current of the power supplied from the outside, and check whether the detected voltage or current exceeds a threshold value. The power sensing unit 3115, although not shown, may include a resistor for detecting a voltage or current of the power supplied from the outside, and a comparator for comparing a voltage value or current value of the detected power with a threshold value to output the comparison result. Based on the check result of the power sensing unit 3115, the power transmission control unit 312 may control a switching unit (not illustrated) to cut off power applied to the transmitting (Tx) coil 3111*b*.

Referring to FIG. 11B, the power supply unit of the terminal charging circuit 400 may include a receiving (Rx) coil 4911*a* and a rectifier (or rectifying) circuit 4913.

A current may be induced into the receiving (Rx) coil 4911*a* by the change of the magnetic field formed in the transmitting (Tx) coil 3111*b*. The implementation type of the receiving (Rx) coil 4911*a* may be a planar spiral type or cylindrical solenoid type similarly to the transmitting (Tx) coil 3111*b*.

Furthermore, series and parallel capacitors may be configured to be connected to the receiving (Rx) coil 4911*a* to enhance the effectiveness of wireless power reception or perform resonant detection.

The receiving (Rx) coil 4911*a* may be in the form of a single coil or a plurality of coils.

The rectifier circuit 4913 may perform a full-wave rectification to a current to convert alternating current into direct current. The rectifier circuit 4913, for instance, may be implemented with a full-bridge rectifier generation circuit made of four diodes or a circuit using active components.

In addition, the rectifier circuit 4913 may further include a regulator circuit for converting a rectified current into a more flat and stable direct current. Furthermore, the output power of the rectifier circuit 4913 may be supplied to each constituent element of the power supply unit 290. Furthermore, the rectifier circuit 4913 may further include a DC-DC converter for converting output DC power into a suitable voltage to adjust it to the power required for each constituent element (for instance, a circuit such as a charger (or charging unit) 298).

The modulation/demodulation unit 493 may be connected to the power receiving unit 491, and may be configured with a resistive element in which resistance varies with respect to direct current, and may be configured with a capacitive element in which reactance varies with respect to alternating current. The power reception control unit 492 may change the resistance or reactance of the modulation/demodulation unit 493 to modulate a wireless power signal received to the power receiving unit 491.

On the other hand, the power supply unit may further include a power sensing unit 4914. The power sensing unit 4914 at the side of the terminal charging circuit 400 monitors a voltage and/or current of the power rectified by the rectifier circuit 4913, and if the voltage and/or current of the rectified power exceeds a threshold value as a result of monitoring, then the power reception control unit 492 transmits a power control message to the wireless charging module 250 to transfer suitable power.

FIG. 12 is a conceptual view illustrating an operation of a light-emitting module 240 disclosed herein.

An operation principle of the light-emitting module 240 according to one exemplary embodiment is the same as that of the wireless charging module 250 aforementioned in FIG. 11A, so description thereof will not be repeated.

Figure 13:
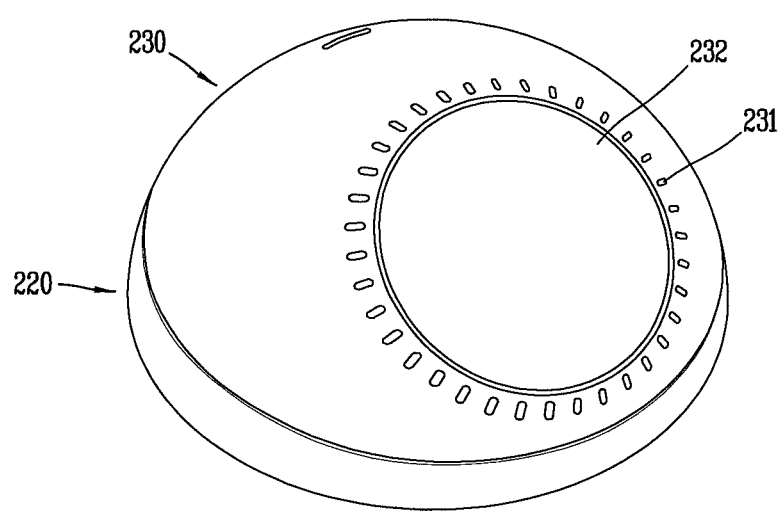
FIG. 13 is a conceptual view illustrating a bottom surface of a wireless charging device disclosed herein.
Figure 14:
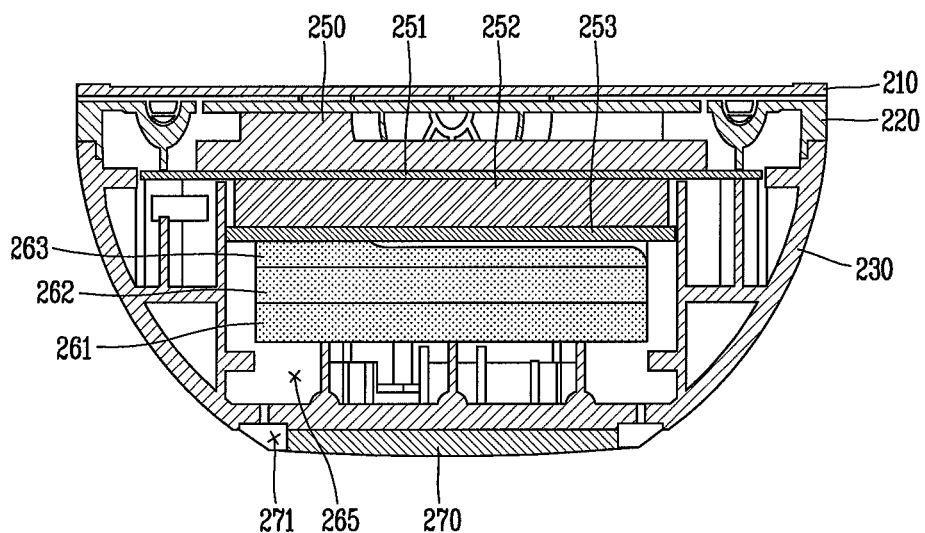
FIG. 14 is a conceptual view illustrating an operation of a speaker module disclosed herein.

FIG. 13 is a conceptual view illustrating a bottom surface 232 of a wireless charging device 200 disclosed herein, and FIG. 14 is a conceptual view illustrating an operation of a speaker module 260 disclosed herein.

As illustrated in FIGS. 13 and 14, speaker holes 231 may be formed along a circumference of a bottom surface 232 of a housing 230 such that sound can be emitted through the bottom of the device. This may utilize a principle that sound is refracted and widely spread when the sound is emitted to a lower end. Also, a shield can 252 may be disposed between a circuit board and an audio module to prevent a magnetic field formed in the wireless charging module 250 from affecting the speaker module 260.

A soundproof pad 253 may be disposed on a lower surface of the shield can 252. A weight member 262, an adhesive member 263 and the like may be disposed beneath the soundproof pad 253.

The speaker module 260 may form one soundproof wall in a manner that the audio circuit 261, the weight member 262, the adhesive member 263 and the soundproof pad 253 are integrally coupled.

A resonance space may be formed at one side of the speaker module 260 so as to be connected to the speaker holes 231 formed on the lower surface of the device. Sounds generated from the audio circuit 261 may be emitted to the lower end of the device through the speaker holes 231, and sounds remaining in the device without being emitted may be reflected and amplified in the resonance space, and then emitted through the speaker holes 231.

The configurations and methods of the mobile terminal 100 in the aforesaid embodiments may not be limitedly applied, but such embodiments may be configured by a selective combination of all or part of the embodiments so as to implement many variations.

Therefore, an aspect of the detailed description is to provide a new type of wireless charging device, capable of realizing a unique design and guiding a mobile terminal to an optimal charging position.

Also, an aspect of the detailed description is to provide a wireless charging device, capable of improving terminal usability during a charging operation in a manner of adjusting an orientation (direction) of a mounted terminal.

To achieve these and other advantages and in accordance with the purpose of this specification, as embodied and broadly described herein, there is provided a wireless charging device, including a housing having a wireless charging module mounted therein, an upper cover covering an upper surface of the housing, the upper cover having screw holes formed on one surface thereof, screws inserted into the screw holes to couple the housing and the upper cover to each other, magnets inserted into the screw holes to overlap the screws, and a pad disposed to cover the upper cover, the pad having a terminal mounting surface.

In accordance with one exemplary embodiment disclosed herein, the screw holes may include first and second screw holes formed in a first direction by being spaced apart from each other.

In accordance with one exemplary embodiment disclosed herein, the screw holes may include third and fourth screw holes formed in a second direction, which intersects with the first direction, by being spaced apart from each other.

The first and second directions may be orthogonal to each other.

In accordance with one exemplary embodiment disclosed herein, the terminal mounting surface may be inclined toward the ground, and the pad may be formed in such a manner that a thickness thereof is gradually reduced from both end portions of the second direction toward a central portion.

In accordance with one exemplary embodiment disclosed herein, the pad may include an anti-slip member formed to cover at least part of the terminal mounting surface.

In accordance with one exemplary embodiment disclosed herein, the anti-slip member may be disposed along an edge of the pad.

In accordance with one exemplary embodiment disclosed herein, the mounting surface may include a gel layer with a shape changed in correspondence with a shape of the terminal when the terminal is placed.

In accordance with one exemplary embodiment disclosed herein, the pad may include a rotation hinge coupled to the housing to form a rotation shaft.

To achieve these and other advantages and in accordance with the purpose of this specification, as embodied and broadly described herein, there is also provided a wireless charging device in accordance with another exemplary embodiment, the device including a housing having a wireless charging module mounted therein, an upper cover covering an upper surface of the housing, and having arcuate guide holes formed to be symmetrical to each other based on a center thereof, and a pad disposed to cover the upper cover. The pad may include hooks formed on one surface thereof and inserted into the guide holes to be stopped in the upper cover, and a terminal mounting surface formed on the other surface thereof.

In accordance with one exemplary embodiment disclosed herein, each of the guide holes may gradually increase in width from one end toward the other end.

In accordance with one exemplary embodiment disclosed herein, each of the hooks may include protrusion members extending from the one surface and inserted into the guide hole, and disposed to face each other.

In accordance with one exemplary embodiment disclosed herein, the wireless charging device may further include a light-emitting module disposed between the upper cover and the pad, and configured to emit light by interaction with the terminal placed on the mounting surface.

In accordance with one exemplary embodiment disclosed herein, the light-emitting module may include light sources, and a coil electrically connected to the light sources and surrounding the light sources.

In accordance with one exemplary embodiment disclosed herein, the upper cover may include screw holes, and the wireless charging device may further include screws inserted into the screw holes to couple the housing and the upper cover to each other, and magnets inserted into the screw holes in a manner of overlapping the screws.

In accordance with one exemplary embodiment disclosed herein, a shield member may be disposed between the screw holes and the light-emitting module to shield magnetic fields of the magnets. The shield member may be made of a ferrite material.

In accordance with one exemplary embodiment disclosed herein, the housing may include speaker holes formed along a circumference of a bottom surface thereof.

In accordance with one exemplary embodiment disclosed herein, the wireless charging device may further include a speaker module disposed beneath the wireless charging module.

In accordance with one exemplary embodiment disclosed herein, a resonance space may be formed at one side of the speaker module within the housing to be connected to the speaker holes.

In accordance with at least one exemplary embodiment disclosed herein, a wireless charging device may be provided with a terminal mounting surface formed in a curved manner. This may allow a mobile terminal having a curved rear surface to be more stably placed and charged.

An upper cover of the wireless charging device may be provided with magnets to guide a mobile terminal to an optimal charging position. This may enhance charging efficiency of the device and prevent the mobile terminal from being damaged due to being separated from the wireless charging device.

Also, the magnets may be arranged in all directions of the upper cover, such that a mobile terminal can be guided to the optimal charging position even if it is placed in any of a horizontal direction or a vertical direction.

The wireless charging device may also include a light-emitting module which emits light by interaction with a terminal without a connection to a separate power source, thereby reducing power consumption of the device, and allowing for a visual check of a charging state of the terminal.

In addition, the wireless charging device may include speaker holes formed along a circumference of a bottom surface thereof, and a resonance space formed within a housing and connected to the speaker holes. Accordingly, sound can be emitted through the bottom of the device and also be refracted to be more widely spread. This may result in improvement of a performance of a speaker module mounted in the device.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless charging device comprising:
a housing having a wireless charging module mounted therein;
an upper cover that covers an upper surface of the housing, the upper cover having screw holes formed on one surface thereof;
screws inserted into the screw holes to couple the housing and the upper cover to each other;
magnets inserted into the screw holes to overlap the screws;
a pad disposed to cover the upper cover, the pad having a terminal mounting surface; and
a shielding member configured to be disposed between the magnets and a plurality of light sources arranged to face between the adjacent magnets and having shielding walls each surrounding a part of a circumference of the plurality of light sources.

2. The wireless charging device of claim 1, wherein the screw holes comprise first and second screw holes formed in a first direction along an upper surface of the upper cover and spaced apart from each other.

3. The wireless charging device of claim 2, wherein the screw holes include third and fourth screw holes formed in a second direction along the upper surface of the upper cover and spaced apart from each other, the second direction intersecting with the first direction.

4. The wireless charging device of claim 3, wherein the first and second directions are orthogonal to each other.

5. The wireless charging device of claim 3, wherein the magnets provided in the screw holes correspond to magnets provided on the terminal,
the magnets provided in the first and second screw holes being configured to couple to the magnets on the terminal to align the terminal along the first direction, and
the magnets provided in the third and fourth screw holes being configured to couple to the magnets on the terminal to align the terminal along the second direction orthogonal to the first direction.

6. The wireless charging device of claim 4, wherein the terminal mounting surface is inclined toward the ground, and
wherein a thickness of the pad gradually decreases from both end portions in the second direction toward a central portion of the pad.

7. The wireless charging device of claim 6, wherein the pad includes an anti-slip member formed to cover at least part of the terminal mounting surface the anti-slip member being disposed along an edge of the pad.

8. The wireless charging device of claim 1, wherein the terminal mounting surface includes a gel layer that changes shape to correspond with a shape of the terminal when the terminal is placed.

9. The wireless charging device of claim 1, wherein the plurality of light sources emit light in different directions through a region in which the shielding walls are not formed and magnetic fields from the magnets are shielded by the shielding walls.

10. A wireless charging device comprising:
a housing having a wireless charging module mounted therein;
an upper cover that covers an upper surface of the housing, the upper cover having arcuate guide holes formed to be symmetrical to each other relative on a center thereof;
a pad disposed to cover the upper cover, the pad having hooks formed on a bottom surface of the pad and inserted into the guide holes to be coupled to the upper cover, and a terminal mounting surface formed on an upper surface of the pad, the upper surface being opposite the lower surface; and
a shielding member configured to be disposed between the magnets and a plurality of light sources arranged to face between the adjacent magnets and having shielding walls each surrounding a part of a circumference of the plurality of light sources.

11. The wireless charging device of claim 10, wherein each of the guide holes gradually increases in width from one end toward the other end.

12. The wireless charging device of claim 11, wherein each of the hooks includes protrusion members that extend from the bottom surface of the pad and inserted into the guide hole, the protrusion members being disposed to face each other.

13. The wireless charging device of claim 10, further comprising:
a light-emitting module disposed between the upper cover and the pad, and configured to emit light by interaction with the terminal placed on the mounting surface; and
a light-guide film disposed between the light-emitting module and the pad, and configured to emit light irradiated from the light-emitting module through a transparent member disposed along an outer edge thereof.

14. The wireless charging device of claim 13, wherein the light-emitting module includes:
at least one light source; and
a coil electrically connected to the at least one light source and surrounding the at least one light source.

15. The wireless charging device of claim 13, wherein the upper cover includes screw holes, and
wherein the wireless charging device further includes:
screws inserted into the screw holes to couple the housing and the upper cover to each other, and
magnets inserted into the screw holes over the screws, a lower surface of the magnets coupled to a top surface of the screws and an upper surface of the magnets provided near an opening of the screw holes.

16. The wireless charging device of claim 15, wherein a shield member is disposed between the screw holes and the light-emitting module to shield magnetic fields of the magnets.

17. The wireless charging device of claim 16, wherein the shield member is made of a ferrite material.

18. The wireless charging device of claim 10, wherein the housing includes speaker holes formed along a circumference of a bottom surface thereof.

19. The wireless charging device of claim 18, further including:
a speaker module disposed beneath the wireless charging module.

20. The wireless charging device of claim 19, wherein a resonance space is formed at one side of the speaker module within the housing to be connected to the speaker holes.

* * * * *